US008360458B2

(12) United States Patent
Stanifer et al.

(10) Patent No.: US 8,360,458 B2
(45) Date of Patent: Jan. 29, 2013

(54) REMOVABLE SAFETY CHAIN TIE DOWN APPARATUS

(75) Inventors: Eric J. Stanifer, Mishawaka, IN (US); Richard W. McCoy, Granger, IN (US)

(73) Assignee: Cequent Towing Products, Plymouth, MI (US)

( * ) Notice: Subject to any disclaimer, the term of this patent is extended or adjusted under 35 U.S.C. 154(b) by 0 days.

(21) Appl. No.: 13/541,976

(22) Filed: Jul. 5, 2012

(65) Prior Publication Data
US 2012/0274048 A1 Nov. 1, 2012

Related U.S. Application Data

(63) Continuation of application No. 12/578,978, filed on Oct. 14, 2009, now Pat. No. 8,215,658.

(60) Provisional application No. 61/195,968, filed on Oct. 14, 2008.

(51) Int. Cl.
*B60D 1/14* (2006.01)

(52) U.S. Cl. .................. 280/491.5; 280/901; 280/438.1; 280/433; 280/495

(58) Field of Classification Search ............... 280/491.5, 280/901, 433, 495, 438.1
See application file for complete search history.

(56) References Cited

U.S. PATENT DOCUMENTS

| 2,962,245 | A | 11/1960 | Molzan et al. |
| 3,106,377 | A | 10/1963 | Cotton |
| 3,252,681 | A | 5/1966 | Watts |
| 3,367,000 | A | 2/1968 | Schluter |
| 3,595,125 | A | 7/1971 | Jacobs |
| 3,739,432 | A | 6/1973 | Sander et al. |
| 4,091,744 | A | 5/1978 | Crissy et al. |
| 4,457,650 | A | 7/1984 | Tseng |
| 4,630,982 | A | 12/1986 | Fenner |
| 5,265,992 | A | 11/1993 | Jensen |
| 5,571,270 | A | 11/1996 | Larkin |
| 5,738,363 | A | 4/1998 | Larkin |
| 5,738,471 | A | 4/1998 | Zentner et al. |
| 5,893,575 | A | 4/1999 | Larkin |
| 6,065,766 | A | 5/2000 | Pulliam |
| 6,193,261 | B1 | 2/2001 | Hahka |
| 6,467,791 | B1 | 10/2002 | Fandrich et al. |
| 6,502,846 | B2 | 1/2003 | Fandrich et al. |
| 6,520,528 | B2 | 2/2003 | Fandrich et al. |
| 7,121,573 | B2 | 10/2006 | Lindenman et al. |
| 7,472,919 | B2 | 1/2009 | Pratt et al. |
| 7,828,317 | B2 | 11/2010 | Withers et al. |
| 7,988,176 | B2 * | 8/2011 | Colibert et al. ............ 280/416.1 |
| 8,215,658 | B2 | 7/2012 | Stanifer et al. |
| 2003/0034633 | A1 | 2/2003 | Belinky |
| 2006/0163840 | A1 | 7/2006 | Schwalbe |
| 2008/0315557 | A1 | 12/2008 | Stanifer et al. |

* cited by examiner

*Primary Examiner* — Tashiana Adams
*Assistant Examiner* — Marlon Arce
(74) *Attorney, Agent, or Firm* — McDonald Hopkins LLC

(57) ABSTRACT

A tie down apparatus that may be utilized for securing an item, such as a safety chain, wherein the tie down apparatus may be used with a hitch mounting system. In one embodiment, the tie down apparatus may include a receiving member, a tie down member, and a clocking member. The receiving member may include an opening located there through. The tie down member may include at least one aperture, wherein the tie down member may be capable of being located and rotated within the receiving member. The tie down member may be rotated either clockwise or counterclockwise. The locking member may include at least one leg capable of being housed within the aperture. The locking member may engage the receiving member once the tie down member is rotated, thereby trapping the item within the tie down apparatus.

20 Claims, 8 Drawing Sheets

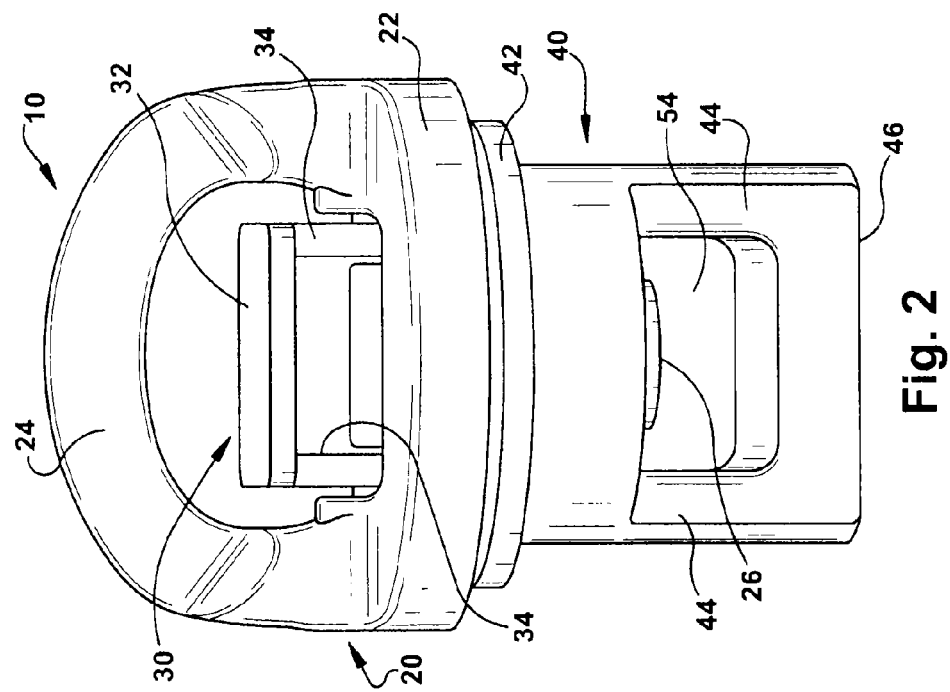
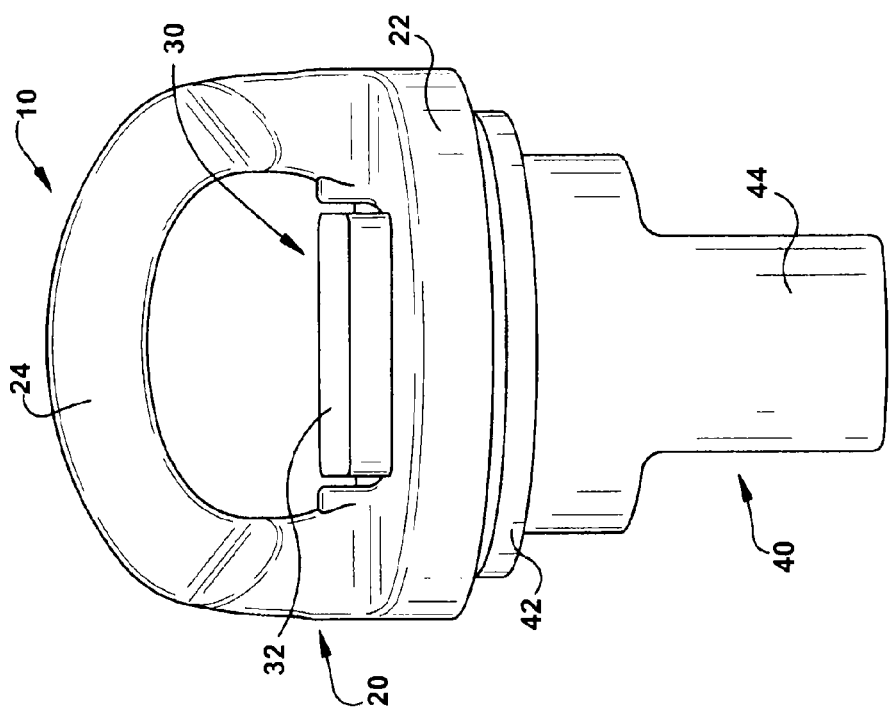
Fig. 1
Fig. 2

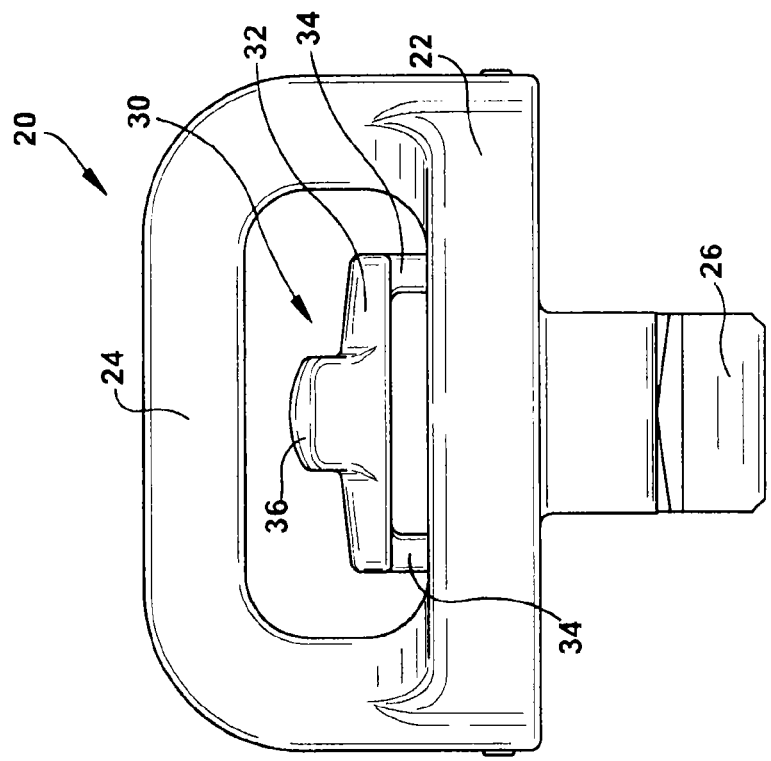
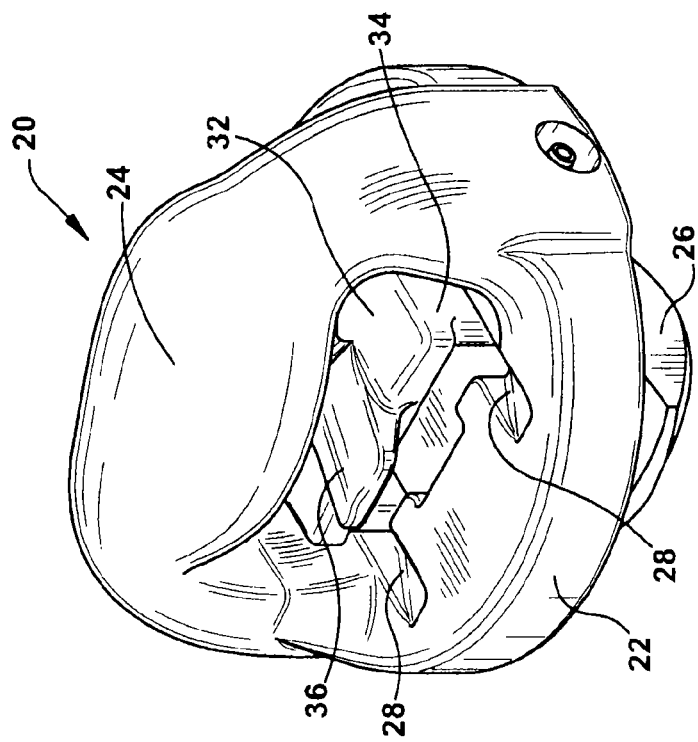
Fig. 6
Fig. 5

REMOVABLE SAFETY CHAIN TIE DOWN APPARATUS

CROSS-REFERENCE TO RELATED APPLICATION

This application is a continuation of prior U.S. patent application Ser. No. 12/578,978, entitled "Removable Safety Chain Tie Down Apparatus" filed on Oct. 14, 2009, which claims benefit from U.S. Provisional Patent Application No. 61/195,968, entitled "Removable Safety Chain Tie Down Apparatus," filed on Oct. 14, 2008, both of which are hereby incorporated in their entirety by reference.

FIELD OF INVENTION

The present invention generally relates to hitches used for coupling a trailer to a towing vehicle and more particularly to a removable tie down apparatus for securing the safety chains of a trailer being towed.

BACKGROUND

It is well known in the art to utilize a trailer hitch to connect a trailer to a towing vehicle. There are many different types of trailer hitches known in the art that may be attached to the towing vehicle in a variety of ways, depending on the type of hitch. Some of the most common types of hitches include gooseneck, fifth wheel, front mount, and the like. Typically, trailers are connected to a towing vehicle by way of a ball hitch secured to the vehicle and a ball socket coupling mechanism on the trailer that mounts over the ball and thereby allows for the trailer to pivot behind the towing vehicle.

The ball hitch of some hitches, such as gooseneck and fifth wheel, for example, is commonly mounted in the bed of a pickup truck near the longitudinal centerline of the bed, so that the weight of the trailer is evenly distributed between the tires on the two sides of the pickup truck. This type of hitch is often secured to the truck structure in an opening cut in the bed of the truck, so that a substantial portion of the hitch attachment is located below the bed of the truck. In addition, the ball typically may be removed or lowered to a stowed position below the bed to ensure that the use of the bed is not substantially hindered by the presence of the ball.

In addition, there are five classes of hitches for towing trailers. Each class is designed for a specific trailer weight range. When selecting the appropriate hitch make sure the weight rating of the hitch is greater than the loaded weight of the trailer that will be towed. The tow vehicle capacity for weight carrying and hitch attachment will vary and will sometimes dictate the class of hitch that can be used. The class of hitch helps determine how much weight can safely be fastened to the towing vehicle, whereas the style differences exist to accommodate different towing needs and different towing vehicles. Gooseneck trailer hitches are considered to be heavy duty and are made to fasten trailers weighing 10,000 pounds or more. Gooseneck hitches are made to accommodate things like horse trailers and other oddly shaped trailers whose weight is not evenly distributed.

A gooseneck hitch is designed for use in a pickup truck similar to a fifth wheel. The difference is that the gooseneck uses a ball and coupler verses a kingpin and pin receiver. Gooseneck hitches are offered in a few types of configurations and can be mounted above or below the trucks pickup bed. Either design (above or below) allows for minimal obstruction when the ball is not in the towing position.

As is known in the art, a gooseneck trailer hitch is placed in the truck bed above the rear axle and the trailer is then secured to it. A gooseneck hitch is much stronger than a regular ball hitch and can haul much more weight. The primary goal of the gooseneck hitch is to provide as much of the gooseneck hitch assembly as possible beneath the bed of the pick-up truck. The hitch balls themselves are typically removable or retractable so that when the hitch is not in use, the hitch ball may be removed or refracted so as not to obstruct the bed of the pick-up truck in any significant manner.

With primary emphasis placed on storing/removing these hitch assemblies so as to avoid obstructions within the truck bed, hitch assemblies have generally overlooked the importance of placement of maintenance fittings and typically only include such fittings in inconvenient locations, such as under the bed of the truck.

Consumers often utilize additional trailer hitch accessories with their trailers. These accessories are products that mount or secure to the trailer, such as safety chains, couplers, coupler locks, jacks, trailer lights, bearing protectors, winches and hitch balls, for example.

It is well known in the art, to utilize safety chains with a trailer. Safety chains are an added safety measure that is used to provide a secondary means of connection between the rear of the towing vehicle and the front of the trailer or towed vehicle in case of separation. If the safety chain is to be of value, assurance must be had that the safety chain will stay connected to the link if the hitch fails. The consumer should also make sure that the safety chains are never dragging on the road when hooked up. Safety chains come in a variety of different sizes and strengths. It is important to always use a safety chain that is equal to or stronger than the towing system that is being used.

Safety chains may be secured between the trailer and an anchor within the truck, preferably associated with the hitch to prevent the trailer from breaking away from the pickup truck in the event that the hitch uncouples from the hitch ball. To insure that the safety chain anchor does not substantially obstruct the bed of the truck when the hitch is not being used, the anchor must be adapted so that it may be removed from the hitch or so that it may be lowered to a stowed position in the hitch. Therefore, a need exists in the art to provide an improved safety chain tie down apparatus that is easily removable and operable as well as work with a variety of different hitches.

SUMMARY OF THE PRESENT INVENTION

The present invention provides an apparatus for a removable safety chain tie down. The tie down apparatus may be utilized for securing an item, such as a safety chain, wherein the tie down apparatus may be used with a hitch mounting system. In one embodiment, the tie down apparatus may include a receiving member, a tie down member, and a clocking member. The receiving member may include an opening located there through. The tie down member may include at least one aperture, wherein the tie down member may be capable of being located and rotated within the receiving member. The tie down member may be rotated either clockwise or counterclockwise. The locking member may include at least one leg capable of being housed within the aperture. The locking member may engage the receiving member once the tie down member is rotated, thereby trapping the item within the tie down apparatus.

A hitch mounting system may include at least one rail capable of being connected to a vehicle frame, at least one socket formed in the at least one rail, a mid rail connected to the at least one rail, where the mid rail includes a hitch ball socket, and a receiving member capable of being secured to the at least one socket. The hitch mounting system may also include a body member capable of being inserted into the receiving member, and a locking member extending through the body member, where rotating the body member in a direction displaces the locking member perpendicular to the direction of rotation engaging the locking member with the receiving member.

A hitch mounting system may include at least one rail capable of being connected to a vehicle frame, where the rail includes a pair of sockets integrally formed with the at least one rail, a mid rail capable of being connected to the at least one rail, where the mid rail includes a hitch ball socket, and a receiving member capable of being secured within the socket. The hitch mounting system may also include a body member having at least one aperture, where the body member is capable of engagement with the receiving member, and a locking member having at least one leg capable of being housed within the at least one aperture of the body member, where upon rotation of the body member about a first axis the locking member is displaced in a second axis parallel with the first axis engaging the locking member with the receiving member.

A hitch mounting system may include at least one tubular member, a central member attached to the tubular member, a pair of integrally formed members having first and second end portions, where the first end portions are received within the tubular member and the second end portions are capable of attaching to a frame of a vehicle, and a socket integrally formed in each of the pair of integrally formed members. The hitch mounting system may also include a pair of receiving members, where each of the pair of receiving members is positioned in the sockets, a body member inserted into the receiving member, and a locking member extending through the body member, where rotating the body member in a direction displaces the locking member perpendicular to the direction of rotation engaging the locking member with the receiving member securing the body member to the receiving member.

BRIEF DESCRIPTION OF THE DRAWINGS

Objects and advantages together with the operation of the invention may be better understood by reference to the detailed description taken in connection with the following illustrations, wherein:

FIG. 1 illustrates a perspective view of an embodiment of the safety chain tie down assembly in a locked position.

FIG. 2 illustrates a perspective view of the safety chain tie down assembly of FIG. 1 in an unlocked position.

FIG. 5 illustrates a perspective view of an embodiment of the insertion or tie down member in an unlocked position.

FIG. 6 illustrates a side view of the tie down member of FIG. 5.

DETAILED DESCRIPTION

Figure 4:
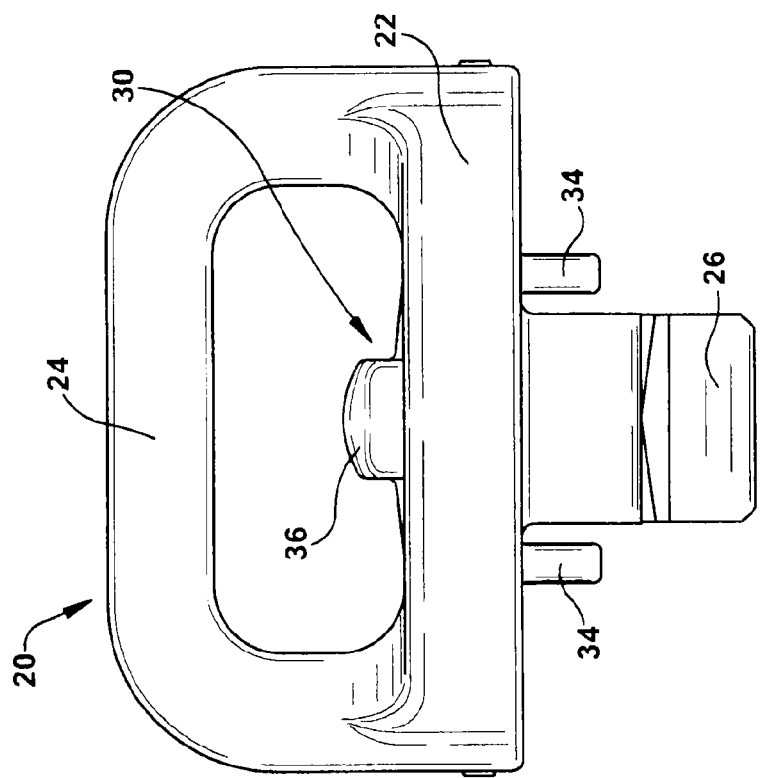
FIG. 4 illustrates a side view of the tie down member of FIG. 3.

Reference will now be made in detail to exemplary embodiments of the present invention, examples of which are illustrated in the accompanying drawings. It is to be understood that other embodiments may be utilized and structural and functional changes may be made without departing from the respective scope of the present invention.

A removable safety chain tie down apparatus or assembly 10 is illustrated in FIGS. 1 and 2. The removable safety chain tie down apparatus 10 can improve the safety of securing the trailer to a towing vehicle. The assembly 10 may include an insertion or tie down member 20, a locking member 30 and a receiving member 40. The tie down assembly 10 provides a practical and hidden safety chain tie down apparatus that may be associated with and attached to a trailer mounting system where the apparatus 10 may be adapted to reliably and securely engage the links of a safety chain (not shown). Unlike the prior art, the safety chain tie down assembly 10 may be reliably secured to the safety chain itself without the need for additional intermediate hooks or couplings that might be subject to failure.

The safety chain tie down apparatus 10 may be constructed to securely and removably anchor down the safety chain that may be in use with a trailer hitch. The apparatus 10 may be of any number of appropriate shapes or sizes in addition to those shown in the figures and may have a streamlined design and appearance that may be aesthetically pleasing. The safety chain apparatus 10 may be used with any appropriate trailer hitch mounting kit, such as those that utilize rail mounts or cross members 12 for example, such as with the "Signature Series" produced and sold by Cequent.

The insertion or tie down member 20 may be of any suitable shape or size, such as substantially ovalar, rectangular or other shapes. The tie down member 20 may be constructed from a variety of appropriate materials, such as of a durable plastic material. The tie down member 20 may be a one-piece integrally formed member.

The insertion or tie down member 20 is illustrated in FIGS. 1-6. The tie down member 20 may include a body 22, a handle 24 and a column or post 26. The handle 24 may extend outwardly from one side of the body 22. The column 26 may extend outwardly from an opposite side of the body 22, whereby the handle 24 and the column 26 may extend outwardly in opposite directions from one another.

Figure 3:
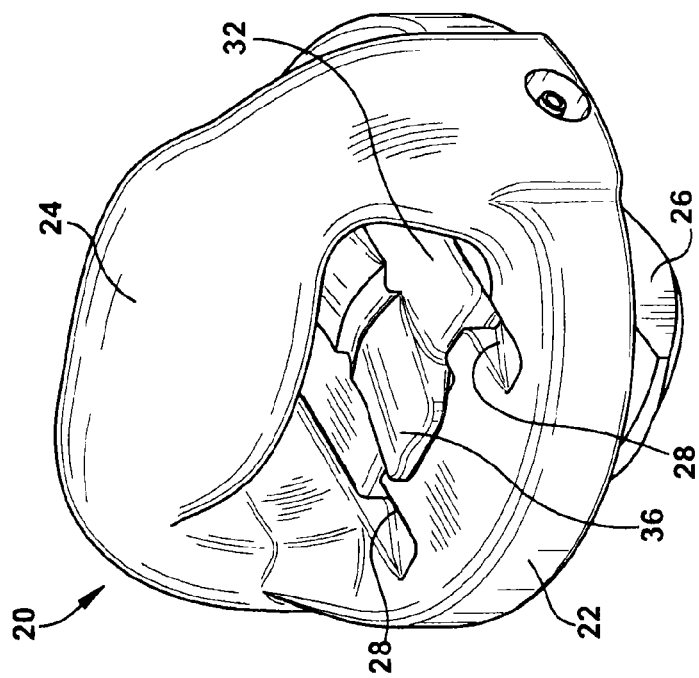
FIG. 3 illustrates a perspective view of an embodiment of an insertion or tie down member in a locked position.

The handle 24 may be of any appropriate shape or size. The handle 24 may also be of a contoured shape for ease and comfort of use, as best shown in FIGS. 3 and 5. While the handle 24 is shown as extending from two sides of the body 22, it is to be understood that the handle 24 may only be attached to the body 22 on one side (such as a generally L-shaped handle) or may be attached on any desired number of sides, such as three or four, and the like. In addition, the handle 24 may be integrally formed with the body 22 or may be a separate piece from the handle, which may require attachment by any appropriate means, such as with fasteners, welding, or the like.

The column 26 of the tie down member 20 may be of any appropriate shape or size, such as a cylindrical, ovalar, triangular or rectangular and are not be limited to the shapes shown in the Figures. The column or post 26 may also be curved into a generally hooked shape as it extends away from the body 22. The body 22 may include at least one aperture 28, as best shown in FIGS. 3 and 5. The aperture 28 may be of any appropriate shape or size, such as being correspondingly shaped and sized to a leg 34 on the locking member 30. The apertures 28 may be located on either side of the column 26.

Figure 11:
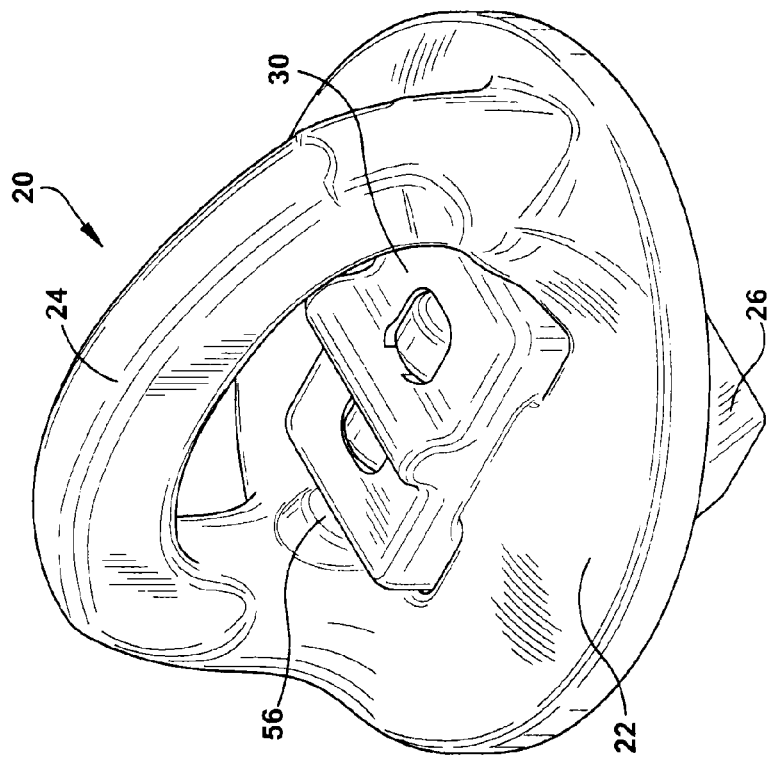
FIG. 11 illustrates a perspective view of an alternative embodiment of a tie down member.
Figure 12:
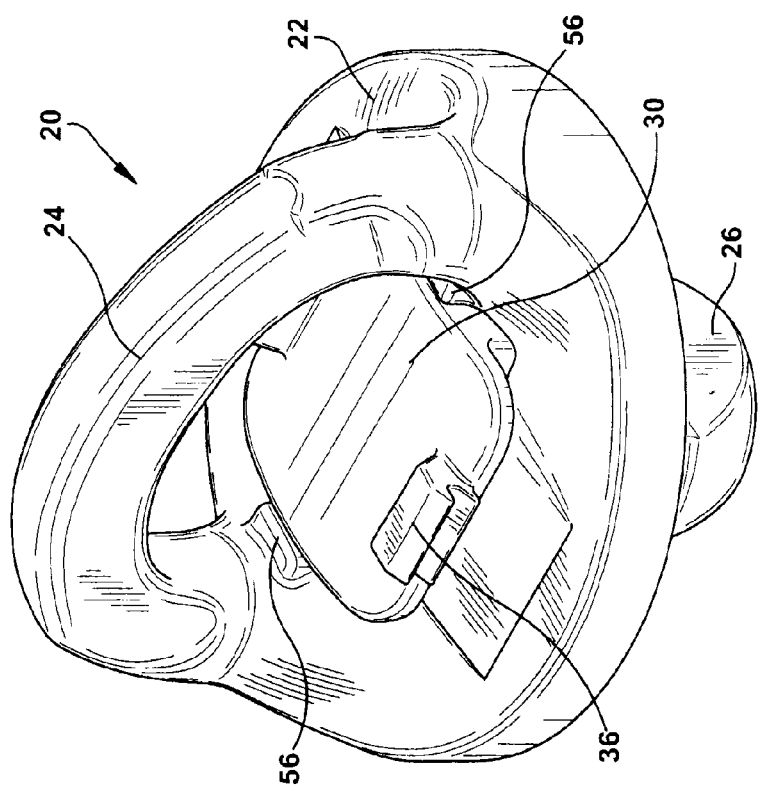
FIG. 12 illustrates a perspective view of an alternative embodiment of a tie down member.
Figure 13:
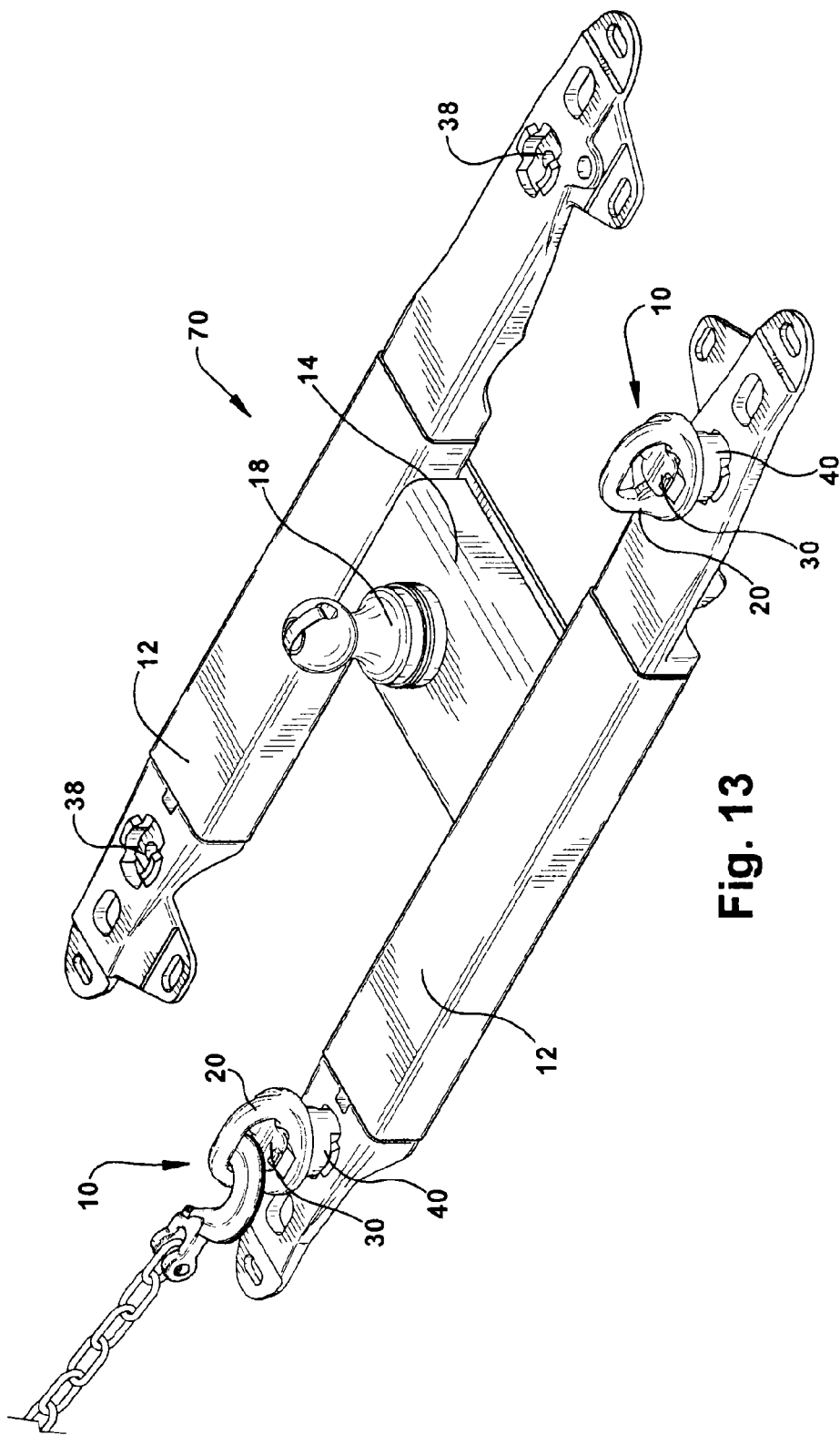
FIG. 13 illustrates a perspective view of an embodiment of an integrated hitch mounting system with an insertion or tie down member secured thereto and a chain secured to the insertion or tie down member.

As an alternative, the tie down member 20 may also include at least one locking or compression tab 56 shown in FIGS. 11 and 12. The locking or compression tabs 56 may be positioned at any appropriate location on the tie down member 20, such as located near the base(s) of the handle 24. The locking tabs 56 may be of any appropriate shape or size, such as a generally circular or square shape, for example. The locking or compression tabs 56 either may allow for the locking member 30 to snap into a secure engagement with the body 22 or to provide a compression fit between the locking member 30 and the body The locking member 30 is illustrated in FIGS. 1-6. The locking member 30 may include a body or bridge member 32 and at least one leg 34. The bridge member 32 may be of any appropriate shape or size, such as a generally square, rectangular, or circular shape, for example. The locking member 30 may be a one-piece integrally formed member. On either end of the bridge member 32 there may be a leg 34. The legs 34 may extend outwardly, such as perpendicularly away from the bridge member 32, for example. The legs 34 may be of any appropriate shape or size, such as, for example, a cylindrical, ovular, rectangular, or flat plane, for example. While the locking component 30 has been shown and disclosed utilizing certain features, the locking component 30 may utilize any appropriate configuration to lock the safety chain into place within the tie down member 20 and receiving member 40.

Figure 10:
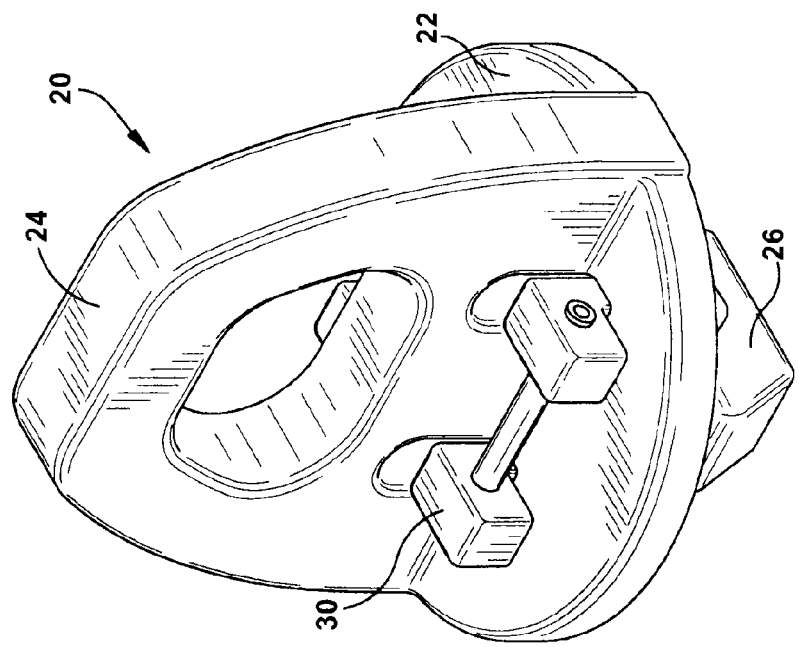
FIG. 10 illustrates a perspective view of an alternative embodiment of an insertion or tie down member.

As an alternative, the locking member 30 may include at least one lifting tab 36, as shown in FIGS. 3-6. The lifting tabs 36 may be located at any appropriate location on the body or bridge member 32, such as on opposing sides of the legs 34 but should not be limited to such. The lifting tabs 35 may also be of any appropriate shape or size. The lifting tabs 36 may be utilized to ease and aid in the lifting of the locking member 30 up from within the tie down member 20. FIGS. 10-12 illustrate alternative embodiments of the tie down member 20 and the locking member 30.

FIGS. 1, 2 and 7-9 illustrate the receiving member 40. The receiving member 40 may include an upper rim 42, at least one sidewall 44 and a base or bottom wall 46. The receiving member 40 may be of any appropriate shape or size, such as a cylindrical, oval, or a square shape, for example, and should not be limited to that shown in the Figures. The receiving member 40 may be a one-piece integrally formed member. The sidewalls 44 may extend generally perpendicularly from the upper rim 42. While shown having two sidewalls 44 it is to be understood that there may be any appropriate number of sidewalls 44 and should not be limited to that shown and disclosed herein.

The base or bottom wall 46 may connect the two sidewalls 44, as best shown in FIG. 2. The bottom wall 46 and the sidewalls 44 may generally form an opening 54 therein, as shown in FIG. 2. The receiving member 40 may also include an aperture 48 that may receive the column or post 26 of the tie down member 20, whereby the aperture 48 may also be correspondingly shaped and sized to receive the column 26. The upper rim 42 may extend radially and outwardly from the receiving member 40. The upper rim 42 may provide a surface for the body 22 of the tie down member 20 to abut or rest on, for example, as best shown in FIGS. 1 and 2.

In use and to secure a safety chain, for example, a consumer may place the tie down member 20 on top of the upper rim 42 of the receiving member 40, so that the column 26 may drop into the corresponding aperture 48. Once the tie down member 20 is placed within the receiving member 40, the consumer may rotate the tie down member 20 ninety degrees, either clockwise or counterclockwise, into a lock position, as best shown in FIGS. 1, 3 and 4.

When the components of the safety chain tie down apparatus 10 have been rotated into the correct position, the locking component 30 will drop into place, as shown in FIGS. 2, 5 and 6. The locking component 30 may prevent the tie down member 20 and thus the safety chain from coming out of the receiving member 40 during use. The locking component 30 may be captured in the receiving member 40 to prevent it from inadvertently coming out of the receiving member 40 when not in use. For example, when the safety chain components 20, 30, 40 are properly attached, it physically makes it impossible for the locking member 30 to unlock.

Trailer hitches, such as a gooseneck or fifth wheel hitch may be mounted to a truck bed. These types of hitches are often mounted beneath the truck bed in conjunction with the truck's own frame rails, such as with cross members or rails 12 for example. In addition, these cross members 12 may be mounted to the truck bed with the use of the receiving members 40, also known as pucks. Utilizing a puck mounting system for the trailer hitch may allow the hitch to be installed in the pickup truck bed with only four small holes. Utilizing a puck mounting system may provide uninhibited use of your truck bed when the hitch is dismounted. The puck mounting system may also provide for a wider platform and mounting surface, which increases the stability.

The safety chain tie down apparatus 10 may take advantage of an under bed mounting system designed for the various types of hitches. These types of hitches may mount on top of an under bed rail mounting system where the hitch ball may either be removed or folded down for easy access. For example, the safety chain apparatus 10 may allow users that have an existing rail kit to use the receiving members 40 for safety chain hook ups on gooseneck trailers.

Figure 7:
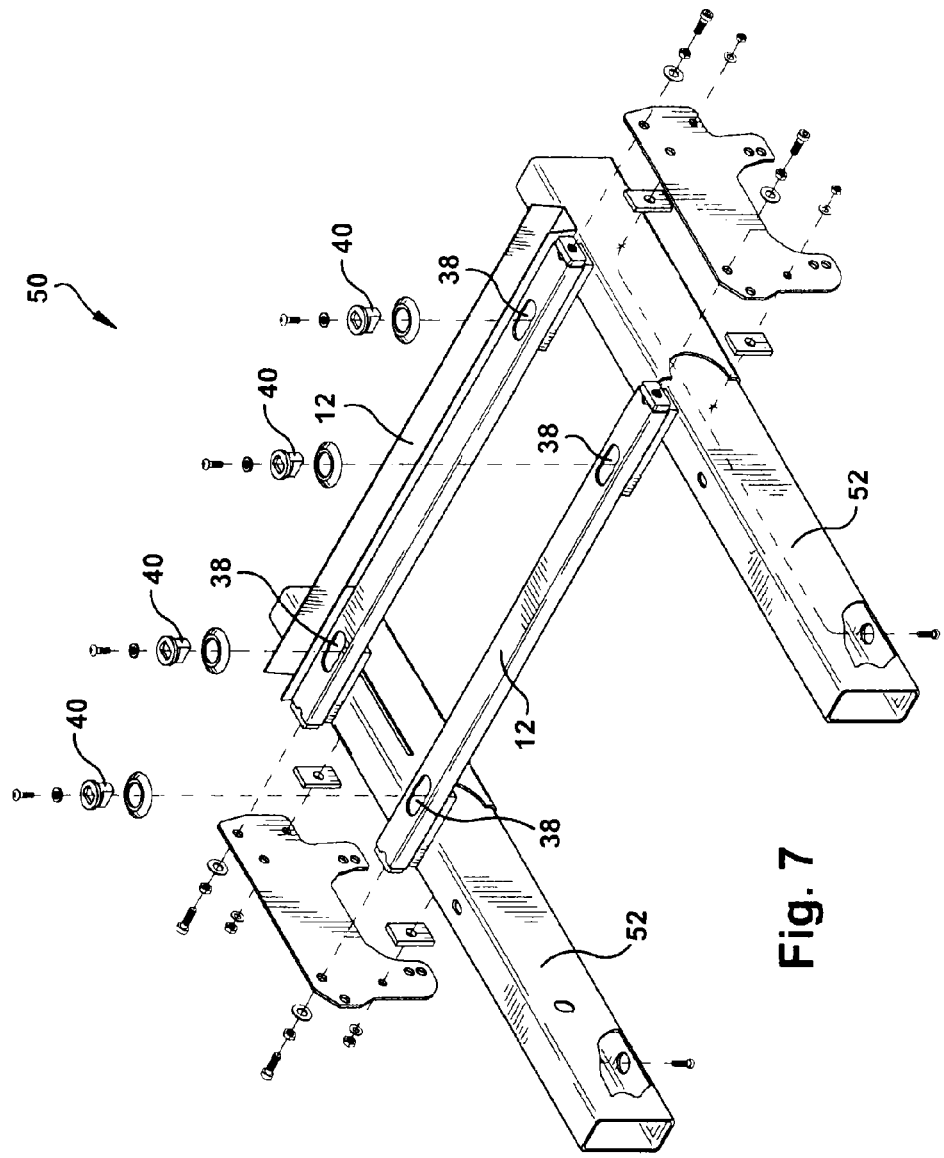
FIG. 7 illustrates a perspective view of a prior art hitch mounting system.

FIG. 7 illustrates a prior art vehicle mounting system 50. The vehicle mounting system 50 may include at least two rails or cross members 12. The cross members 12 may include sockets 38 for attachment with a receiving member 40. The cross members 12 may mount to the vehicle framework 52 by any appropriate means, such as with fasteners, by welding or the like. Each receiving member 40 may be mounted in a socket 38 provided in either of the cross members 12. The receiving member 40 may be secured in the socket 38 by any appropriate means, such as with fasteners, welding or the like. For example, a fastener, such as a bolt, could pass through an aperture in the bottom wall of the cross member 12 and be secured in place by a cooperating nut and lock washer (not shown) if desired.

Figure 8:
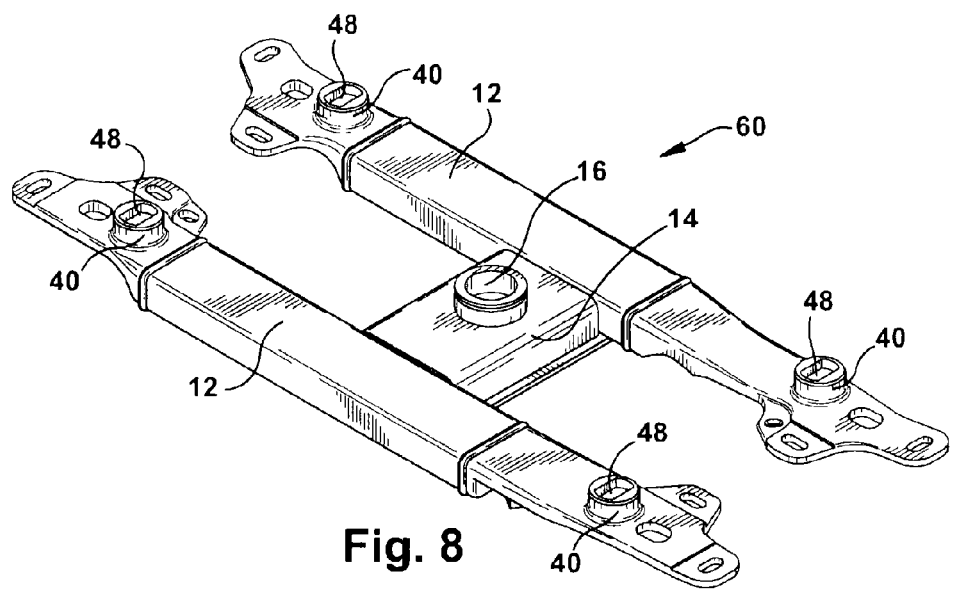
FIG. 8 illustrates a perspective view of an embodiment of an integrated hitch mounting system.
Figure 9:
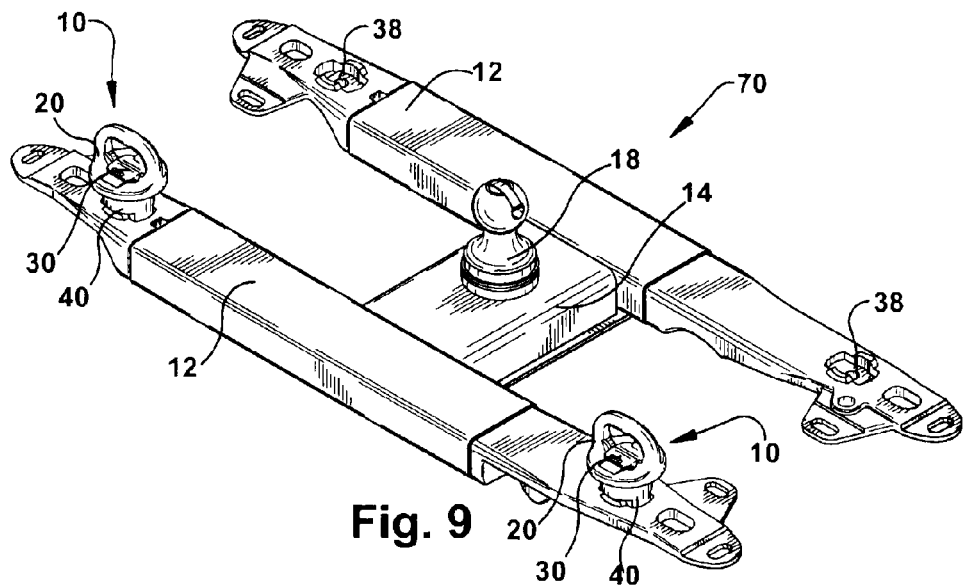
FIG. 9 illustrates a perspective view of an embodiment of an integrated hitch mounting system.

FIG. 8 illustrates an integrally formed mounting system 60, whereby the receiving members 40 may be formed within the cross members 12. FIG. 9 illustrates a mounting system 70 where the receiving members 40 may be placed and secured into sockets 38 located within the cross members 12. In FIGS. 8 and 9, the cross members 12 may be attached to one another by a mid rail 14. The hitch ball socket 16 and corresponding hitch ball 18 may be located on the mid rail 14.

Although the preferred embodiment of the present invention has been illustrated in the accompanying drawings and described in the foregoing detailed description, it is to be

Having thus described the invention, we claim:

1. A hitch mounting system comprising:
at least one rail capable of being connected to a vehicle frame;
at least one socket formed in the at least one rail;
a mid rail connected to the at least one rail, wherein the mid rail includes a hitch ball socket;
a receiving member capable of being secured to the at least one socket;
a body member capable of being inserted into the receiving member; and
a locking member extending through the body member, wherein rotating the body member in a direction displaces the locking member perpendicular to the direction of rotation engaging the locking member with the receiving member.

2. The hitch mounting system of claim 1, wherein the receiving member is capable of engagement with a leg of a fifth wheel hitch.

3. The hitch mounting system of claim 1, wherein the hitch ball socket is capable of engagement with a hitch ball.

4. The hitch mounting system of claim 1, wherein the body member comprises a tie down member having at least one aperture.

5. The hitch mounting system of claim 4, wherein the tie down member includes a locking tab capable of securing the locking member within the tie down member.

6. The hitch mounting system of claim 4, wherein the locking member includes a lifting tab and at least one leg capable of being housed within the at least one aperture of the tie down member.

7. The hitch mounting system of claim 6, wherein the lifting tab is located on an opposite side of the at least one leg, the lifting tab capable of lifting the locking member to release the locking member from the receiving member.

8. The hitch mounting system of claim 7, wherein a chain is capable of being attached to the tie down member whereby the chain being attached generally prevents the lifting tab from lifting the locking member.

9. A hitch mounting system comprising:
at least one rail capable of being connected to a vehicle frame, wherein the rail includes a pair of sockets integrally formed with the at least one rail;
a mid rail capable of being connected to the at least one rail, wherein the mid rail includes a hitch ball socket;
a receiving member capable of being secured within the socket;
a body member having at least one aperture, wherein the body member is capable of engagement with the receiving member;
a locking member having at least one leg capable of being housed within the at least one aperture of the body member; and
wherein upon rotation of the body member about a first axis the locking member is displaced in a second axis parallel with the first axis engaging the locking member with the receiving member.

10. The hitch mounting system of claim 9, wherein the hitch ball socket includes a hitch ball that is capable of engagement with a gooseneck hitch.

11. The hitch mounting system of claim 9, wherein the locking member includes a lifting tab distally positioned from the at least one leg and a locking tab capable of securing the locking member within the body member.

12. The hitch mounting system of claim 9, wherein the body member comprises a tie down member.

13. The hitch mounting system of claim 12, wherein the tie down member includes a generally rectangular post, wherein the post substantially prevents rotation of the tie down member beyond a first position when the locking member engages the receiving member.

14. A hitch mounting system comprising:
at least one tubular member;
a central member attached to the tubular member;
a pair of integrally formed members having first and second end portions, wherein the first end portions are received within the tubular member and the second end portions are capable of attaching to a frame of a vehicle;
a socket integrally formed in each of the pair of integrally formed members;
a pair of receiving members, wherein each of the pair of receiving members is positioned in the sockets;
a body member inserted into the receiving member; and
a locking member extending through the body member, wherein rotating the body member in a direction displaces the locking member perpendicular to the direction of rotation engaging the locking member with the receiving member securing the body member to the receiving member.

15. The hitch mounting system of claim 14, wherein rotating the body member to a second position disengages the locking member from the receiving member.

16. The hitch mounting system of claim 15, wherein the body member includes an aperture and the locking member includes a leg capable of being housed within the aperture.

17. The hitch mounting system of claim 16, wherein the locking member includes a lifting tab distally positioned from the leg and extending substantially perpendicular relative to the leg, the lifting tab capable of lifting the locking member disengaging the locking member from the receiving member.

18. The hitch mounting system of claim 17, wherein at least a portion of a chain is capable of engaging the body member.

19. The hitch mounting system of claim 18, wherein engagement of the chain with the body member generally prevents the lifting tab from lifting the locking member.

20. The hitch mounting system of claim 14, wherein the at least one tubular member includes first and second tubular members wherein the central member is attached between the first and second tubular members forming a generally H-shaped one-piece assembly.

* * * * *